Dec. 7, 1943.   J. FRANK   2,335,852
ILLUMINABLE SIGNALING DEVICE
Filed Aug. 22, 1940
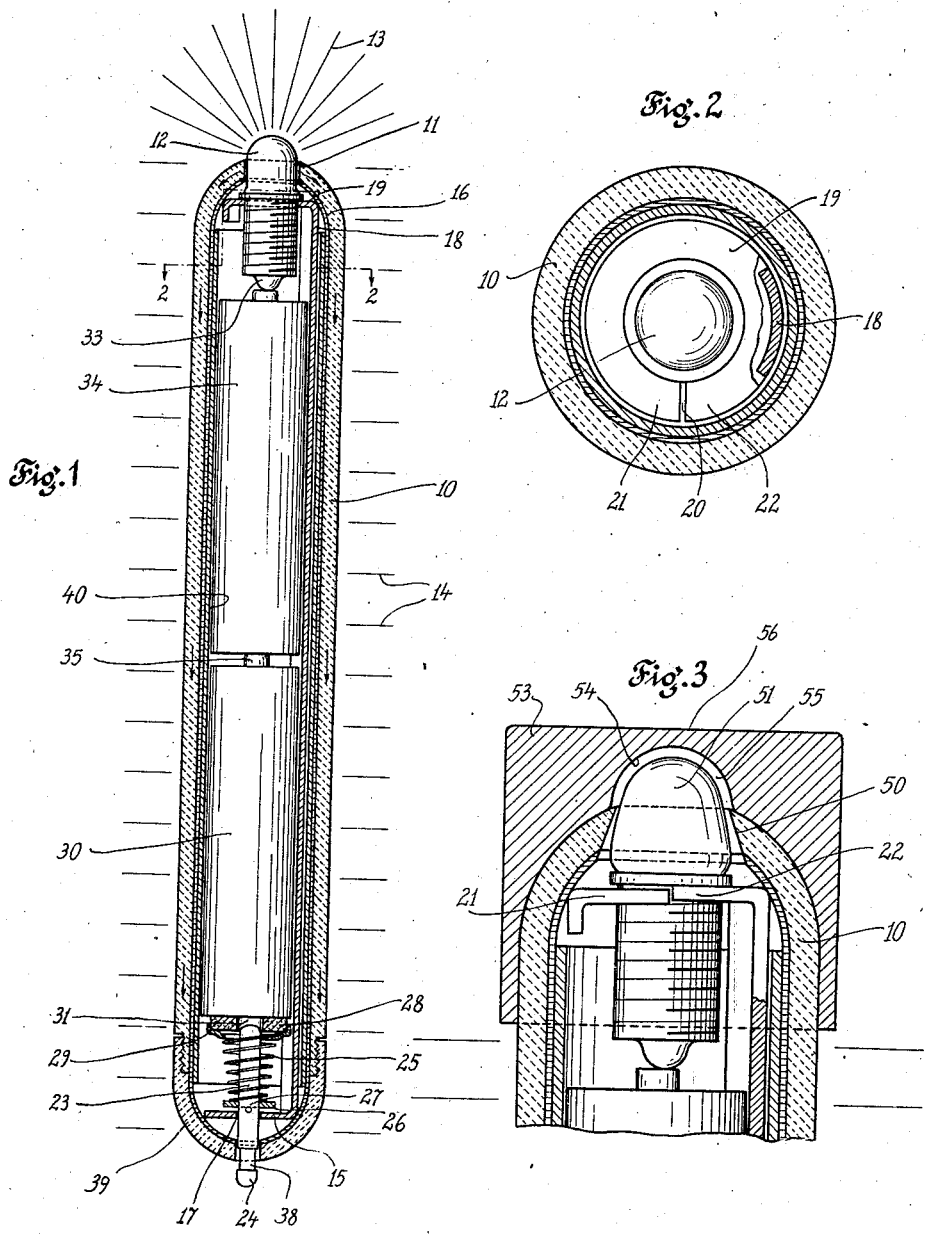
INVENTOR
Joseph Frank.
BY Orville N. Greene
ATTORNEY Patented Dec. 7, 1943

2,335,852

UNITED STATES PATENT OFFICE 2,335,852

ILLUMINABLE SIGNALING DEVICE

Joseph Frank, Brooklyn, N. Y.

Application August 22, 1940, Serial No. 353,615

5 Claims. (Cl. 177—329)

My invention relates to a novel signaling device and more particularly my invention appertains to a signaling device comprising a casing of an acrylate resin in the form of an extended rod or beacon, an opening in one end of the casing, and a light bulb positioned in the opening. The light bulb provides directly projected illumnation and also illuminates the casing itself, the light being fed into the casing through the exposed edge of the opening.

My invention broadly comprises a signaling device by means of which light can be simultaneously forwardly projected in a direct beam and sidewardly emitted from the plastic light-sensitive casing of my signaling device.

The necessity for a portable signaling device which can be employed in military or naval maneuvers to convey signals or to identify officers and men at predetermined distances has long been recognized.

When a direct beam of light is employed for signaling this beam is visible at distances that are far greater than those usually commensurate with secrecy and safety. However, when light of low intensity is employed it is difficult to transmit through such low intensity light, the necessary identification or message.

I have devised a signaling device which is capable of transmitting light both by means of direct projection and what is more important by dynamic illumination of the casing of my device.

My device comprises an appropriately shaped casing of a plastic of the acrylate type. By acrylate type I mean a resin formed from the polymerization of an ester of acrylic acid or of methacrylic acid. The esters commonly employed are the alkyl esters. My plastic may comprise such an acrylate resin per se or a conjoint polymerization product of two or more of such acrylic acid esters. The acrylic acid esters referred to have the peculiar property of piping light. Similarly, polystyrene resin may be used.

It is also within the scope of my invention to employ other light sensitive materials such as a cellulose acetate plastic in which a light sensitive material has been incorporated. Broadly, various plastics containing luminescent agents which react similarly to the acrylic acid esters may be used.

The casing of my invention is preferably formed from an acrylate resin. The casing has an opening at one end and in that opening is disposed a source of illumination such as an incandescent light bulb. Upon illumination of this bulb by a suitable source of electricity such as by batteries contained within the casing, light is projected forwardly in a direct path while at the same time the acrylic acid ester casing picks up light from the light bulb which travels through the edge of the opening in which the light bulb is positioned and pipes such light along the curvature of the casing. This dynamic light induced in the acrylic casing imparts a desirable glow or illumination to the casing.

By suitably providing means for differentially coloring this casing as for example, in the form of stripes or bars or different shaped areas or combinations of colored areas, the casing serves as a means of identification for its bearer.

My novel construction makes possible certain new and unexpected results. By means of a small point source of illumination in the form of a small electric bulb I provide a desirable intensity of light for providing direct illumination and at the same time by constructing my casing of acrylate resin I may pick up light ordinarily wasted at the light source and convey this light through the curvature of the casing to cause the entire casing to be illuminated with a low intensity illumination. This low intensity illumination is specifically desirable for the military purposes of signaling and identification. When the direct illumination is snuffed out, as will be explained more fully later, the low intensity glow of the casing while sufficient to convey intelligence or identification at predetermined distances is not of sufficient intensity to be dangerously visible at an undesirable distance.

Further, inasmuch as this identification or signaling device may be illuminated for considerable periods of time, it is preeminently desirable that the device not become heated to such a point as would make it difficult to handle or such as might cause the plastic material of the structure to warp. By piping the light from a point source of illumination, no considerable heat is set up in the entire casing and a certain dissipation of the light bulb heat is effected.

When direct illumination is not desired the direct light thrown out by the bulb can be snuffed by a snuffer cap leaving as the only source of illumination the dynamic light induced in the acrylate casing.

The means of identification can be imparted to the casing in a number of different ways. The plastic casing itself may be colored by a suitable pigment or dye. Alternatively, a paint, enamel or lacquer can be applied to the interior or exterior of the casing. Further a translucent or transparent shield of colored material may be positioned over or under the casing.

By applying areas of different shapes and colors or by employing stencil shields, various signals can be transmitted by the illuminated casing and various messages imparted.

I further provide a compact and efficient power unit comprising a connecting strip, a bulb seat in one end of said connecting strip, a bearing seat in the other end of said connector strip, and a circuit-completing plunger positioned in said bearing seat. Batteries are held in the connector strip and the assembly can be handled as a unit.

It is the object of my invention to provide a novel signaling device in which the casing provides means for signaling or means for identification.

It is a further object of my invention to provide a signaling device having an illuminable casing.

It is a further object of my invention to provide as a novel device a casing comprising an ester of acrylic acid or methacrylic acid and means for illuminating that casing.

It is a further object of my invention to provide a device having an acrylate resin casing and a means for applying dynamic illumination to that casing.

It is a further object of my invention to provide a signaling device having a transparent or translucent casing of an acrylate resin, said casing being marked with means for identification thereof in combination with a means for imparting illumination to that casing.

A further object of my invention is to provide a signaling device carrying a unit comprising a bulb holder means and an electrical circuit and means for providing electrical connection between batteries and a bulb held in such bulb holding means.

It is a further object of my invention to provide a split ring bulb holding device in which a bulb base may be screwed.

It is a further object of my invention to provide in combination a light sensitive casing, means for providing indirect illumination of such casing and means for altering such indirect casing illumination for the transmission of intelligence.

Other objects of my invention will be apparent from the drawing, the specific description of which follows:

Figure 1 is a partial cross section of the signaling device of my invention, the batteries contained therein being shown in elevation.

Figure 2 is a cross section taken along the line 2—2 of Figure 1.

Figure 3 is a partial cross section of a modified form of my invention in which the opening in which the bulb is secured is bevelled at an angle and in which a snuffer cap is positioned over the bulb to prevent direct illumination by the bulb.

Referring now more specifically to the drawing, in Figure 1 I show a casing 10 which comprises a polymerization product of an ester of acrylic or methacrylic acid. This resin for example, may be methyl methacrylate. The casing has an opening 11 and in this opening 11 is positioned a bulb 12. The bulb 12 which is supplied by a suitable source of electricity throws light out directly as indicated by the rays 13 and at the same time light from the bulb 12 is picked up by the exposed edges of the opening 11 and travels as shown by the arrows down to the casing 10 and from there it is emitted outwardly as indicated at 14.

The device here shown provides direct illumination 13 which may be utilized as for example for general purposes or for code signaling.

The bulb 12 may be variously colored for any purpose desired. For example, when it is desired to prevent detection from a distance the color used may be blue.

The light 14 thrown out by the casing 10 may be modified by a layer of coloring material 16 applied to the interior of the casing. This layer 16 may be in the form of a lacquer or a preformed sheet of colored material. When for example, this layer of coloring material is red, a red or rose hue is imparted to the light emitted by the casing 10. By means of strips, bars or other shapes applied either below or above or integrally included in the casing 10, various intelligence may be transmitted and identification secured.

The desired color may be either applied in the form of a base layer 16 or the acrylic acid ester itself can carry a dye or pigment, or such coloring material may be applied on the exterior of the casing. In this connection signals or intelligence may be transmitted by stenciled shields in the form, for example, of a paper or plastic cylinder adapted to be superimposed over the casing 10. Such a shield might be transparent or opaque in suitably designated portions. If opaque such shield might have cut out areas permitting light to come through.

The specific mechanism which I here show as the means for providing electricity for the bulb 12 comprises a connector strip 18 formed into a right angle seat 19 at its upper end. The seat 19 as will be more clearly seen in Figures 2 and 3 is in the form of a split ring, the split occurring at 20 and the two portions 21 and 22 being displaced with respect to one another as can be clearly seen in Figure 3. The bulb 12 upon being fitted into the split ring seat 19 is rotated and such rotation causes the bulb to be screwed into place because of the displaced split portions 21 and 22. The turned over seat portion 19 frictionally engages the interior of the casing 10 and the connector strip 18 extends, as is shown, down the length of the casing and at the bottom thereof, it again turns at right angles to provide both a bearing seat for the push button connector and a means for holding the unit firmly in place within the casing.

The right angle turn is marked by the numeral 15. In an opening 17 in the right angle 15 is positioned a plunger 23 which extends out from the casing 10 to provide an exposed portion 24 to which pressure may be applied by the thumb of the user. The plunger upon being pressed acts against the spring 25 against which it bears by means of the washer 26 keyed at 27. At the bottom of the spring 25, a fibrous washer 28 is attached by means of clamps 29. When the plunger 23 is impelled inwardly by means of pressure exerted on 24, it contacts the battery 30 at the area 31 and an electrical connection is thereby set up. Inasmuch as there is but a very small clearance of the plunger 23 in the opening 17 namely a clearance of .001 to .002 inch, the ordinary manipulation of this plunger causes it to contact the metallic right angle 15 so that the current travels from the area 31 of the battery 30 through the plunger 23, through the right angle 15, through the connector metal strip 18 to the right angle seat 19 and thus to the bulb 12. Bulb 12 contacts the battery 34 by means of the projection 33. The battery 34 is in electrical connection with the battery 30 at 35 whereby a complete electrical circuit is obtained.

If it is desired to lock the plunger 24 in contact relation so as to provide continuous illumination of the bulb 12 then the plunger 23 upon being pressed inwardly is also pressed sidewardly so that the recessed portion 38 grips the inner edge of the plastic cap 39 and locks thereon.

To conceal the batteries and connector stripping contained within the transparent or translucent casing 10, I may provide a shield 40, as for example, a tube of colored paper or plastic. This shield may also be used to color the light of the casing 10. I may surround the base of bulb 12 with an insulating washer (not shown) to prevent short-circuiting of the system.

The plastic cap 39 is in screw thread engagement with the casing 10 and the entire unit contained within the casing including bulb, plunger, connector strip and batteries may be withdrawn by removing cap 39 and gripping the right angle turn 15 of the connector strip 18.

Referring now more specifically to Figure 3, I show a modified form of my invention in which it will be noted that I provide a bevelled wall 50 for the side wall of the opening in the casing 10 in which the light bulb 51 is disposed. This bevelled wall 50 has the advantage in that it provides a greater edge surface by means of which a greater amount of light may be picked up from the bulb 51. The bulb 51 may have a sloping exterior to facilitate a transmission of light but the essential feature of this modification is the bevelled or slope cut surface of the edge 50 by means of which a greater area for picking up light is provided.

When it is desired to prevent direct illumination and employ only the illuminated casing for signaling or identification purposes, I provide a snuffer cap 53 adapted to fit over the top of the casing 10. This snuffer cap 53 may be provided with an internal reflecting surface 54 which reflecting surface acts to reflect back light thrown thereon. This reflected light is added to the light passing directly from the light bulb to the edge wall of the opening in the casing and thus provides an increased amount of light for the casing 10.

The snuffer cap should be so spaced as to provide a space 55 between the bulb and the cap to prevent accidental fracture of the bulb. The snuffer cap has a flat bottom and this flat bottom may act as a base so that the signaling or identification device may be up-ended on such base 56 whereupon it stands erect.

I prefer to form the casing 10 by injection molding since I can therefore obtain an integral seamless casing with an opening having accurately shaped edges. I may however, form the casing 10 in other ways as for example, by means of a plastic tubing or the casing may be formed by a sheet shaping process or by any known plastic molding operation.

It is also within the scope of my invention to form the edges 11 of a greater thickness than the remainder of the casing 10 and this may be easily effected by an injection molding process since the mold in that case is formed to provide an opening edge 11 of greater thickness than the casing proper. By providing such an edge of increased thickness at the opening where the light is picked up from the light bulb, an increased quantity of light may be obtained from a given source of illumination. Alternatively, variously shaped edges such as an inward arc shape or inwardly pointed V-shape may be employed to obtain an increased opening edge surface area.

Inasmuch as it is desired to prevent the signaling device proper from being overheated, I may provide a reflecting surface on the split rings 21, 22 so that the light and consequently the heat therefrom is reflected away from the interior of my signaling device.

Although I have described a specific mechanism by means of which the electricity is provided for illuminating the bulb 12, it is to be understood that various means may be used for supplying this power and that my invention is primarily concerned with the provision of a signaling device in which the casing is illuminated by an electrical source which also may be employed for direct illumination.

My signaling device is compact, light and sturdy since the plastic employed is relatively resilient and not easily fractured.

As I have herein set forth, various types of identification means may be employed in connection with my dynamically illuminated casing. I intend therefore not to be limited by the specific description herein set forth but only by the claims hereto appended.

I claim:

1. A portable, manually operated combination flash light and signaling device comprising in combination a casing comprising a resin of the acrylate group having an opening in one end thereof, said opening forming exposed edges in said casing, said casing having an appreciable thickness at said opening, a light bulb positioned in said opening in close proximity to the edge of said opening, said light bulb upon illumination supplying direct illumination in the form of emitted light and indirect illumination in the form of light picked up by the edge of said casing of acrylate resin and distributed throughout said casing, means for supplying electricity to said light bulb comprising a connector strip, a right angle turn at one end of said connector strip and a seat for said light bulb in said first mentioned right angle, a right angle turn at the second end of said connector strip, a contact bearing for a circuit completing plunger pin in said second right angle turn.

2. A portable, manually operated combination flash light and signaling device comprising in combination a casing comprising a resin of the acrylate group having an opening in one end thereof, said opening forming exposed edges in said casing, said casing having an appreciable thickness at said opening, a light bulb positioned in said opening in close proximity to the edge of said opening, said light bulb upon illumination supplying direct illumination in the form of emitted light and indirect illumination in the form of light picked up by the edge of said casing of acrylate resin and distributed throughout said casing, means for supplying electricity to said light bulb comprising a connector strip, a right angle turn at one end of said connector strip and a seat for said light bulb in said first mentioned right angle, a right angle turn at the second end of said connector strip, a contact bearing for a circuit completing plunger pin in said second right angle turn, at least one battery held in position in said connector strip.

3. A portable, manually operated combination flash light and signaling device comprising in combination a casing comprising a resin of the acrylate group having an opening in one end thereof, said opening forming exposed edges in said casing, said casing having an appreciable thickness at said opening, a light bulb positioned in said opening in close proximity to the edge of said opening, said light bulb upon illumination supplying direct illumination in the form of emitted light and indirect illumination in the form of light picked up by the edge of said casing of acrylate resin and distributed throughout said casing, means for supplying electricity to said light bulb comprising a connector strip, a right angle turn at one end of said connector strip and a seat for said light bulb in said first mentioned right angle, a right angle turn at the second end of said connector strip, a contact bearing for a circuit completing plunger pin in said second right angle turn, at least one battery held in position in said connector strip, a shield positioned over said battery and inside said casing.

4. A portable manually operated combination flash light and signaling device comprising in combination a casing comprising an arcylate light piping plastic having on opening in one end thereof, said opening forming exposed edges in said casing, said casing having an appreciable thickness at said opening, a light bulb positioned in said opening in close proximity to the edge of said opening, said light bulb upon illumination supplying direct illumination in the form of emitted light and indirect illumination in the form of light picked up by the edge of said casing of light piping plastic and distributed throughout said casing, a removable snuffer cap positioned over said opening and over said light bulb and being of such structure so as to snuff out all direct illumination from said light bulb while not substantially blocking said indirect light in said casing.

5. A portable, manually operated combination flash light and signaling device comprising in combination a translucent casing comprising a light piping plastic having an opening in one end thereof, said opening forming exposed edges in said casing, said casing having an appreciable thickness at said opening, a light bulb positioned in said opening in close proximity to the edge of said opening, said light bulb upon illumination supplying direct illumination in the form of emitted light and indirect illumination in the form of light picked up by the edge of said casing of light piping plastic and distributed throughout said casing, and a reflecting shield positioned inside said casing, said shield increasing the light sidewardly diffused from said casing.

JOSEPH FRANK.